US011238476B2

(12) United States Patent
Koenig et al.

(10) Patent No.: US 11,238,476 B2
(45) Date of Patent: Feb. 1, 2022

(54) BLOCKCHAIN-BASED PLATFORM FOR MONETIZING SOCIAL MEDIA FOLLOWING

(71) Applicants: Eric Koenig, Huntington, NY (US); Craig Amazeen, Scottsdale, AZ (US)

(72) Inventors: Eric Koenig, Huntington, NY (US); Craig Amazeen, Scottsdale, AZ (US)

(*) Notice: Subject to any disclaimer, the term of this patent is extended or adjusted under 35 U.S.C. 154(b) by 0 days.

(21) Appl. No.: 16/221,349

(22) Filed: Dec. 14, 2018

(65) Prior Publication Data

US 2020/0193464 A1   Jun. 18, 2020

(51) Int. Cl.
| | |
|---|---|
| G06Q 30/02 | (2012.01) |
| G06Q 50/00 | (2012.01) |
| G06T 19/00 | (2011.01) |
| G06N 20/00 | (2019.01) |
| G06K 19/06 | (2006.01) |
| H04L 9/06 | (2006.01) |

(52) U.S. Cl.
CPC ... *G06Q 30/0209* (2013.01); *G06K 19/06037* (2013.01); *G06N 20/00* (2019.01); *G06Q 30/0269* (2013.01); *G06Q 50/01* (2013.01); *G06T 19/006* (2013.01); *H04L 9/0637* (2013.01); *H04L 2209/38* (2013.01)

(58) Field of Classification Search
CPC .......... G06Q 30/0209; G06Q 30/0269; G06Q 50/01; H04L 9/0637; H04L 2209/38; G06K 19/06037; G06T 19/006; G06N 20/00; A63F 13/86
See application file for complete search history.

(56) References Cited

U.S. PATENT DOCUMENTS

| | | | |
|---|---|---|---|
| 9,833,694 B1* | 12/2017 | Subramani | G06Q 30/02 |
| 10,105,608 B1* | 10/2018 | George | A63F 13/86 |
| 10,229,561 B2* | 3/2019 | Cage | A63F 13/216 |
| 2012/0150695 A1* | 6/2012 | Fan | G06Q 30/02 |
| | | | 705/27.1 |

(Continued)

FOREIGN PATENT DOCUMENTS

WO   WO 2019/023659   *   7/2018

OTHER PUBLICATIONS

"Understanding Location Based Information Sharing in a Mobile Human Computation Game" 2011 IEE Conferences on Internet of Things and Cyber, Physical and Social Computing.*

*Primary Examiner* — Victoria E Frunzi
(74) *Attorney, Agent, or Firm* — Georgiy L. Khayet

(57) ABSTRACT

Disclosed are a blockchain-based platform and methods for monetizing a social media following. An example method may commence with receiving content associated with an object of a social media following. The content may be received from at least one content source. The method may further include aggregating the content received from the at least one content source. The method may continue with gamifying the aggregated content to facilitate interactions of at least one fan of the object of the social media following with the aggregated content. The method may further include awarding at least one virtual asset to the at least one fan based on the interactions with the aggregated content. The method may continue with securely storing transactions associated with the at least one virtual asset to a blockchain and facilitating exchange of the at least one virtual asset for a currency.

30 Claims, 10 Drawing Sheets

(56) References Cited

U.S. PATENT DOCUMENTS

| | | | | |
|---|---|---|---|---|
| 2012/0150759 | A1* | 6/2012 | Tarjan | G06Q 50/01 705/319 |
| 2013/0143670 | A1* | 6/2013 | Junkin | G06Q 30/0283 463/42 |
| 2013/0262203 | A1* | 10/2013 | Frederick | G06Q 30/0209 705/14.12 |
| 2014/0297469 | A1* | 10/2014 | Dukellis | G06Q 30/0613 705/26.41 |
| 2014/0365572 | A1* | 12/2014 | Kennon | G06Q 50/01 709/204 |
| 2015/0242755 | A1* | 8/2015 | Gross | G06Q 50/01 706/46 |
| 2016/0342977 | A1* | 11/2016 | Lam | G06Q 20/02 |
| 2017/0239577 | A1* | 8/2017 | Walling | A63F 13/10 |
| 2018/0349478 | A1* | 12/2018 | Carlisle | G06Q 50/01 |

\* cited by examiner

US 11,238,476 B2

BLOCKCHAIN-BASED PLATFORM FOR MONETIZING SOCIAL MEDIA FOLLOWING

TECHNICAL FIELD

This disclosure generally relates to data processing and, more particularly, to a blockchain-based platform for monetizing social media following.

BACKGROUND

In the social media age, famous people, movies stars, singers, and professionals become social media influencers, i.e., persons that have established credibility in a specific field and won the trust of their social media followers. In digital marketing, marketers, e.g., brands, work with social media influencers to advertise their products and make followers familiar with the marketer. The social media influencers can monetize their influence in social network in multiple ways, such as by writing social media sponsored posts, becoming a brand ambassador, conducting webinars or creating podcasts and charging consumers to access the content, co-creating physical products in collaboration with marketers, becoming a referral partner and receiving a percentage of a sale of a product, and so forth.

Even though marketers and social media influencers can use social media to generate multiple revenue streams, social network users, e.g., fans of a social media influencer, are conventionally not involved in a revenue distribution plan. Therefore, even though social network users may learn information on brands and new products that are helpful to form an opinion with regard to a particular marketer or product, no income is gained from following the social media influencers and being active in the social media.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to a blockchain-based platform and methods for monetizing a social media following. An example platform may include a content aggregation module configured to receive content associated with an object of a social media following. The content may be received from at least one content source. The content aggregation module can be configured to aggregate the content received from the at least one content source. The platform may include a gamifying module configured to gamify the aggregated content to facilitate interactions of at least one fan of the object of the social media following with the aggregated content. The platform may include an award module configured to award at least one virtual asset to the at least one fan based on the interactions with the aggregated content. The award module can be further configured to facilitate exchange of the at least one virtual asset for a currency. The platform can also include a blockchain configured to securely store transactions associated with the at least one virtual asset.

An example blockchain-based method for monetizing a social media following may commence with receiving content associated with an object of a social media following. The content may be received from at least one content source. The method may then proceed with aggregating the content received from the at least one content source and gamifying the aggregated content to facilitate interactions of at least one fan of the object of the social media following with the aggregated content. The method may award at least one virtual asset to the at least one fan based on the interactions with the aggregated content. The method may continue with securely storing transactions associated with the at least one virtual asset to a blockchain and facilitating exchange of the at least one virtual asset for a currency.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
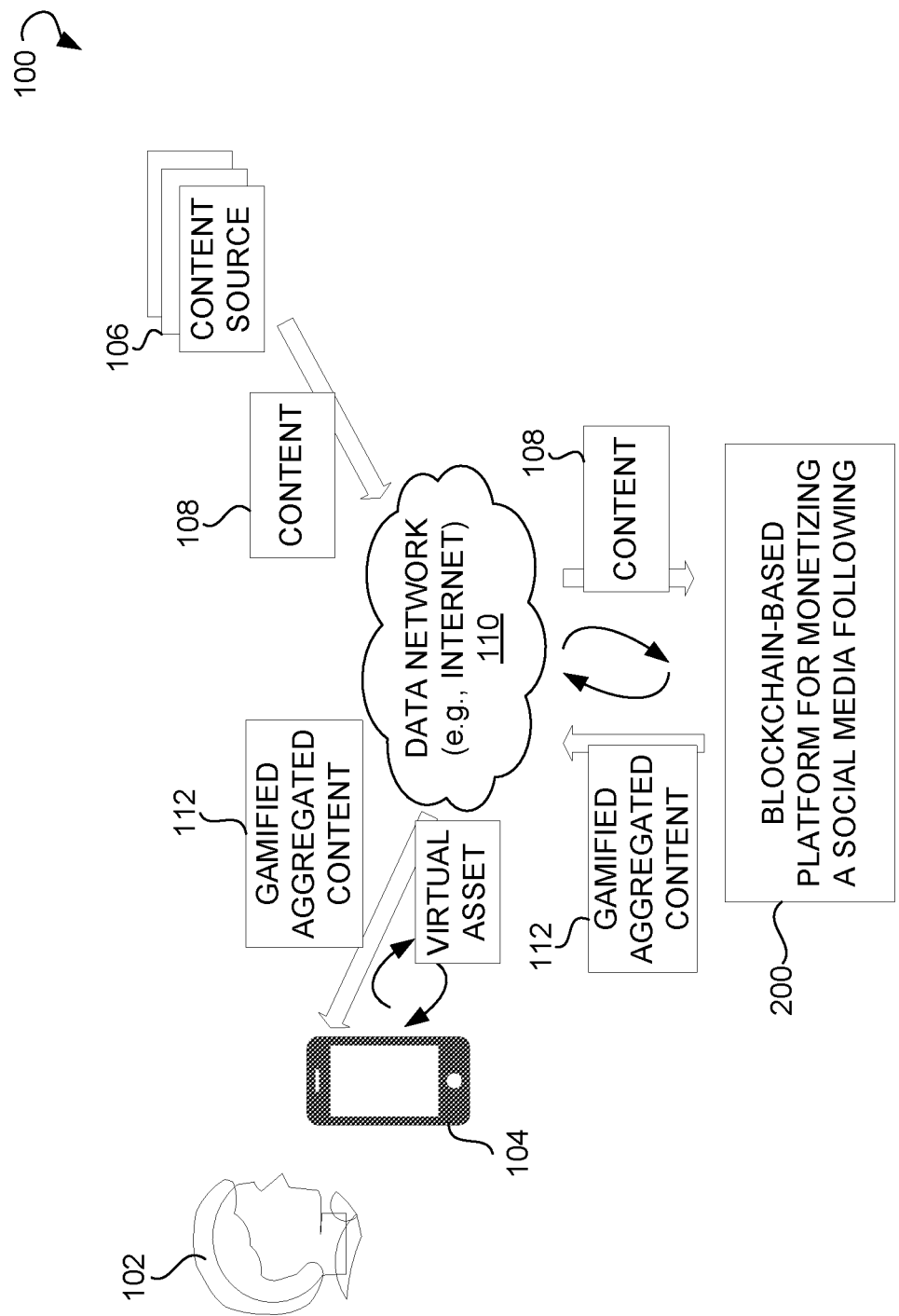
FIG. 1 illustrates an environment within which blockchain-based platforms and methods for monetizing a social media following can be implemented, in accordance with some embodiments.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to a blockchain-based platform for monetizing a social media following. The platform is a fandom management and engagement platform that combines an object of social media following and a community of users within an analytic environment and provides a fully customized, icon-branded, and reward-driven experience enabling better monetization of the social media currency of the object of social media following. The object of social media following may include an icon or an influencer, for example, athletes, musicians, TV stars, movie actors, authors, celebrities, and the like. The icon may be a famous person considered to represent a set of beliefs or a way of life.

The platform may combine content associated with the object of social media following, a community of fans of the object of social media following, and experience of the fans. Specifically, the platform may collect all content related to the object of social media following. The content may include aggregated content, i.e. existing content that is pulled in or repurposed from external sources, such as television (TV) channels, radio channels, newspapers, and the like. The collected content may further include original content, i.e., content created by either administrators of the platform or users that may be unique to the platform. The content may further include icon original content, i.e., content created by the icon that may be unique to the platform. Furthermore, the content may include social media content, i.e., existing content that is pulled in or repurposed from social media platforms.

The platform may use the collected content to create interactive gamified experience for users of the platform, namely for the fans of the object of social media following. Specifically, the platform may gamify the aggregated content to facilitate interactions of the fan of the object of the social media following with the aggregated content. The gamification may include, for example, creation of icon-based trivia, digital scavenger hunts, digital challenges and contests, e.g., in form of microgames, based on the aggregated content.

The user may interact with the gamified content, for example, by playing games. Based on the interactions of the user with the aggregated content, the platform may award a virtual asset to the user. The virtual asset, also referred to herein as a digital asset, may include collectibles earned by the user in the gamified environment. The platform may utilize a blockchain and adaptive logic, machine learning, and AR technologies to further engage and award the user in the gamified environment. The platform may further facilitate exchange of the virtual asset for a currency. In an example embodiment, the currency may include a virtual currency, in-application currency, in-game currency, social media currency, real world currency, and so forth.

Thus, the platform can be combined with an existing social platform of the object of social media following and enable a more engaging community through which a better relationship with the fan base may be provided for the object of social media following. The platform may be bilateral and provide direct lines of communications between the object of social media following and the fans, as well as prohibiting undesirable users, such as trolls, bullies, and haters to provide a positive community experience for the users and the object of social media following.

The platform may further analyze natural traffic consumption and user engagement. The engagement metrics can be tracked to measure consumer usage. Furthermore, the platform may have the ability to change variables or metrics on the fly, via machine learning, artificial intelligence (AI), adaptive logic, and so forth. For example, if nobody is playing an in-application trivia quiz about the object of the social media following, the analysis may show that no one is playing because the rewards provided by the platform are too low. Moreover, the platform may be automated so that the reward structure can change automatically, depending on the situation (i.e., based upon demand/traffic/engagement), similar to the "dynamic" or "flex" pricing model, so that more users can be incentivized to interact with the gamified content.

Because the platform utilizes the blockchain technology, a transparent blockchain ledger can be provided for virtual assets legitimately existing on the platform. This can facilitate an accurate assessment of scarcity of a virtual assets existing versus virtual assets owned. This metric may be presented in a news ticker, or by other methods, to show the user how many virtual assets there are in real time. Moreover, an accurate valuation of the virtual assets may be frequently updated by the platform.

Referring now to the drawings, FIG. 1 illustrates an environment 100 within which a blockchain-based platform for monetizing a social media following can be implemented, in accordance with some embodiments. The environment 100 may include a user 102, a user device 104, a blockchain-based platform 200 for monetizing a social media following (also referred to as a platform 200), a content source 106, and a data network 110 (e.g., the Internet or a computing cloud). The user device 104 and the platform 200 can be connected via the data network 110.

The user 102 may be associated with the user device 104. The user device 104 may include a personal computer (PC), a laptop, a smartphone, a tablet PC, a television set, a smartphone, an Internet phone, a netbook, a network appliance, and so forth. In an example embodiment, the user device 104 may include an augmented reality (AR) enabled user device. In an example embodiment, the user 102 may be a fan of an object of social media following. The object of social media following may be an icon, an influencer, an athlete, a musician, a TV star, a movie actor, an author, a celebrity, a fictional character, and so forth.

The data network 110 may include a computing cloud, the Internet, or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The platform 200 may collect content 108 from a plurality of content sources 106. The collected content 108 may relate to the object of the social media following. The platform 200 may aggregate and gamify all collected content and provide gamified aggregated content 112 to the user device 104. The gamified aggregated content 112 may be intended to facilitate interactions of the user 102 with the aggregated content related to the object of the social media following. The platform 200 may further track the interaction of the user 102 with the gamified aggregated content 112 and reward the user 102 based on the interaction of the user 102.

Figure 2:
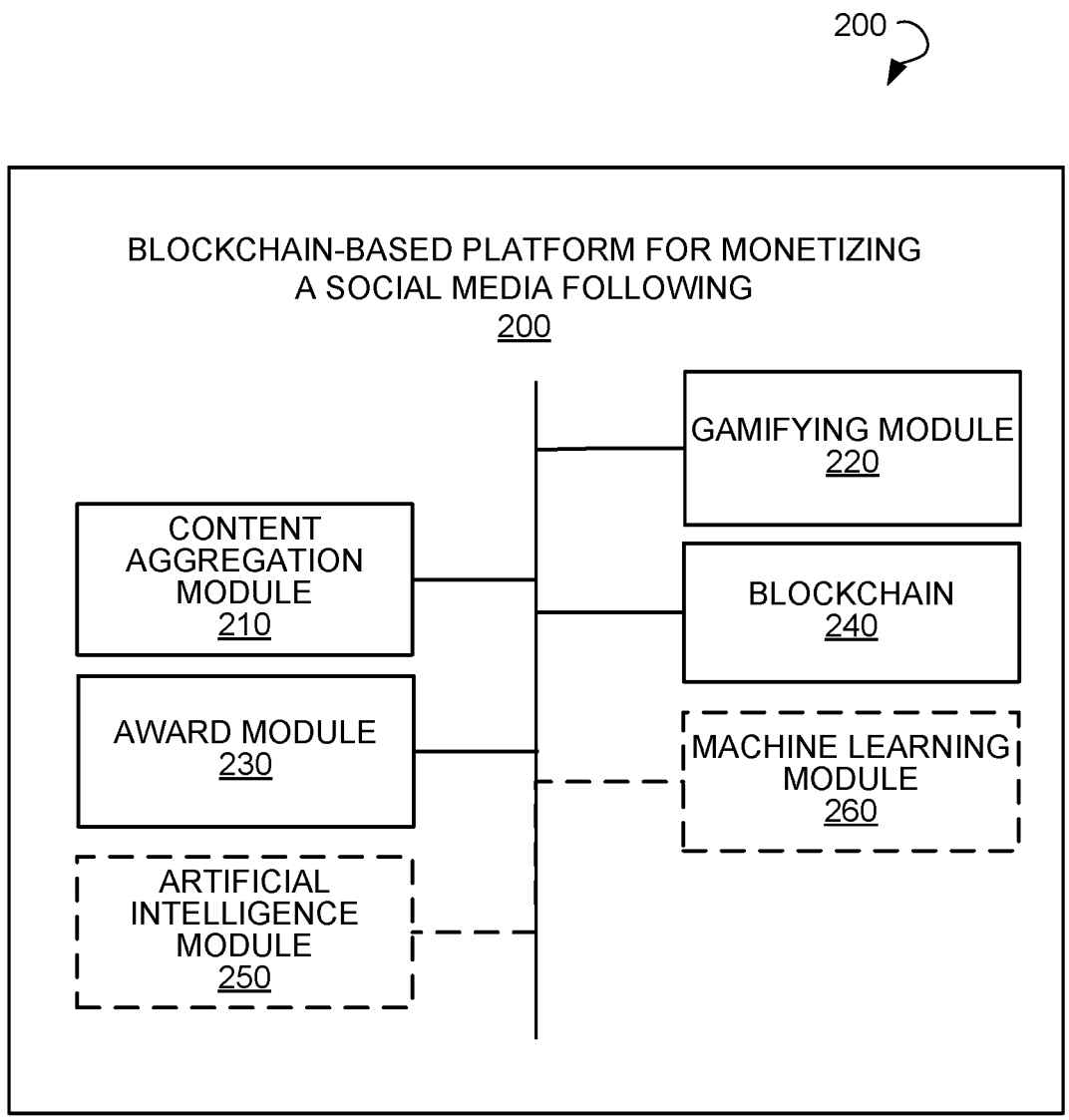
FIG. 2 is a block diagram showing various modules of a blockchain-based platform for monetizing a social media following, in accordance with certain embodiments.

FIG. 2 is a block diagram showing various modules of a blockchain-based platform 200 for monetizing a social media following in accordance with certain embodiments. The platform 200 may include a content aggregation module 210, a gamifying module 220, an award module 230, a blockchain 240, and, optionally, an AI module 250 and a machine learning module 260. In an example embodiment, any of the content aggregation module 210, the gamifying module 220, the award module 230, the blockchain 240, the AI module 250, and the machine learning module 260 may include a programmable processor, such as a microcontroller, central processing unit (CPU), or an application-specific integrated circuit or programmable logic array, such as a field programmable gate array, designed to implement the functions performed by the platform 200. In various embodiments, the platform 200 may be installed on a user device or may be provided as a cloud service residing in a cloud storage.

The content aggregation module 210 may be configured to receive content associated with an object of a social media following. The content may be received from at least one content source. The content aggregation module 210 may be further configured to aggregate the content received from the at least one content source. The at least one content source may include one or more of the following: an external source, original content associated with the object of the social media following, a platform administrator, social media, and so forth. In an example embodiment, the object of the social media following may include at least one of the following: an icon, an influencer, an athlete, a musician, a TV star, a movie actor, an author, a celebrity, a fictional character, and so forth. The object of the social media following may acknowledge the content by providing feedback with regard to content posted on social media, take an action with regard to a comment (such as likes or shares), or repost the content. In a further example embodiment, the content provided by the object of the social media or by an administrator of the platform can be considered validated and/or acknowledged. Therefore, the platform 200 may act as an immersive community of fans with ongoing notoriety, which can be validated and acknowledged by the icon via social interactions both within the platform 200 and outside of the platform 200 (e.g., by a mention on in the Instagram account of the icon). The community architecture may include a collective building of guilds (i.e., sub-communities): either leading guilds, structure guilds, or just being part of the guild.

The gamifying module 220 may be configured to gamify the aggregated content to facilitate interactions of at least one fan of the object of the social media following with the aggregated content. In an example embodiment, the interactions may include a bilateral connection between the at least one fan and the object of the social media following. The interactions may be measured based on consumer usage. The gamification of the aggregated content may include engaging the at least one fan in at least one game activity. In some example embodiments, the gamification of the aggregated content may include customizing an environment of the at least one fan based on personal data and historical interaction data.

In another example embodiment, the interaction with the gamified content may include a scavenger hunt for mystery boxes associated with digital collectibles or virtual assets. Some of the mystery boxes can be built on the blockchain. These digital collectibles and virtual assets may be tokenized. The tokenization may include substituting the virtual asset with an equivalent, referred to as a token having no extrinsic or exploitable meaning or value.

In an example embodiment, the mystery boxes can be accessed through a visible code or an embedded QR code read via the user device. Specifically, the codes can be viewed through the BLOCKv platform. The BLOCKv platform is a development platform that enables the creation and distribution of vAtoms, a virtual asset of the BLOCKv platform. The BLOCKv platform can be fully integrated into the platform 200 and connected directly to the award module 230. The QR codes may exist as physical real world objects or may exist as digital or virtual objects.

The in-application virtual assets may be dynamic and interactive virtual goods that can be individually owned, shared, traded, sold, redeemed, gifted, collected, or just admired. Designed for discovery, the virtual assets can be digitally dropped onto a map, captured in augmented reality, moved into virtual reality, stored, and transferred (i.e., moved seamlessly and instantly between users and across any smart devices). The virtual assets may be limited in nature, making virtual assets sought-after collectibles the value of which may increase over time as supply and demand dictate the market value.

A fan may collect awards based on performance of the at least one game activity. In an example embodiment, a game activity may include one or more of the following: a digital scavenger hunt, answering trivia questions, participating in a digital challenge, in-application purchases, in-application subscriptions, in-application advertising, collection of digital collectibles, sponsorships, in-application challenges, head-to-head competitions, check-in streaks, trivia, sweepstakes, contests, content creation judged by other users, content creation judged by the object of the social media following, leaderboards, and so forth.

The award module 230 may be configured to award at least one virtual asset to the at least one fan based on the interactions with the aggregated content. The award module 230 may be further configured to facilitate exchange of the at least one virtual asset for a currency. In an example embodiment, the at least one virtual asset may include one or more of the following: a digital status symbol, an experience point, a reputation point, a ticket, a coin, a digital image, a video, a text, a code, a booster, a badge, a reputation score, a leaderboards, a digital collectible, a mystery box, a real world award, and so forth.

The at least one virtual asset may be configured for access via a visible code or an embedded Quick Response (QR) code viewed via an application associated with the platform 200. The visible code or the embedded QR code can be associated with physical real world objects or virtual objects. In further example embodiments, the at least one virtual asset can be obtained by capturing physical objects via an AR application running on the AR enabled device of the at least one fan.

The blockchain 240 may be configured to securely store transactions associated with the at least one virtual asset. In an example embodiment, the transactions include trading, sharing, buying, selling, redeeming, gifting, storing, and transferring of the at least one virtual asset. In some embodiment, the at least one virtual asset may be acquired incrementally before the at least one virtual asset is available for an exchange. In further embodiments, the at least one virtual asset may be part of a set. In this case, the at least one virtual asset may increase in value once the set is collected by the at least one fan. Furthermore, the at least one virtual asset may be geo-cached, thereby limiting the ability to collect the at least one virtual asset to specific locations so that the only way to obtain a certain virtual asset is to be in a certain region, city, block, building, and the like. Additionally, the at least one virtual asset may be digitally associated with map locations.

In an example embodiment, the virtual assets may be built using a blockchain technology, so that the virtual assets are unique, registered, and limited in quantity. In addition, through the blockchain technology, the creation, existence, and authenticity of any virtual asset on the platform 200 can be verified at any time. The virtual asset may hold digital value redeemedable for real world value. With long-running autonomous threads, the virtual assets may be network aware and can listen and react to real-world events.

Optionally, the platform 200 may include an AR enabled user device associated with the at least one fan. The AR enabled user device may be configured to run an AR application and enable the at least one fan to capture physical objects via the AR application to obtain the at least one virtual asset.

The AI module 250 and the machine learning module 260 may be configured to be trained on historical data associated with a fan and an object of the social media following.

Figure 3:
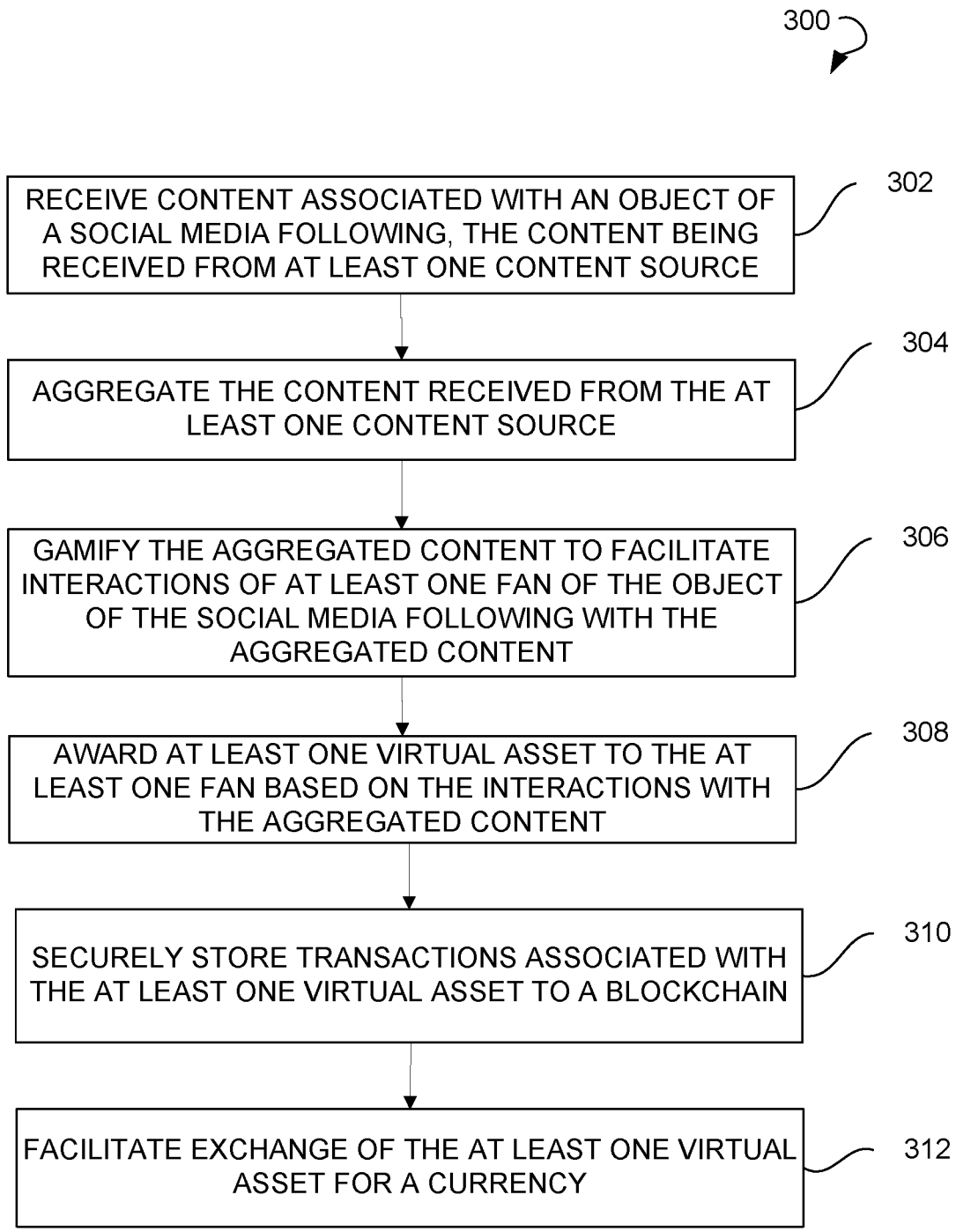
FIG. 3 is a flow chart illustrating a blockchain-based method for monetizing a social media following, in accordance with an example embodiment.

FIG. 3 is a flow chart illustrating a blockchain-based method 300 for monetizing a social media following, in accordance with an example embodiment. In some embodiments, the operations may be combined, performed in parallel, or performed in a different order. The method 300 may also include additional or fewer operations than those illustrated. The method 300 may be performed by processing logic that comprises hardware (e.g., decision making logic, dedicated logic, programmable logic, and microcode), software (such as software run on a general-purpose computer system or a dedicated machine), or a combination of both.

The method 300 may commence with receiving content associated with an object of a social media following at operation 302. The content may be received from at least one content source. The method 300 may continue with aggregating the content received from the at least one content source at operation 304. The method 300 may further include gamifying the aggregated content at operation 306 to facilitate interactions of at least one fan of the object of the social media following with the aggregated content.

The method 300 may then continue with awarding at least one virtual asset to the at least one fan based on the interactions with the aggregated content at operation 308. In an example embodiment, the method 300 may include incentivizing the interactions by dynamically increasing awards for the interactions with underperforming content. The method 300 may further include awarding the at least one fan with an in-application currency. The in-application currency may be redeemable for activities, actions, lockers, and virtual assets.

The method 300 may further include securely storing transactions associated with the at least one virtual asset to a blockchain at operation 310. The method 300 may continue with facilitating exchange of the at least one virtual asset for a currency at operation 312. In an example embodiment, the method 300 may include allowing redemption of the at least one virtual asset for real world value.

In an example embodiment, the method 300 may include limiting a number of the at least one virtual asset to create scarcity and increase demand. The method 300 may include providing a valuation of the at least one virtual asset based on the scarcity of the at least one virtual asset as verified via a blockchain transaction ledger.

Optionally, the method 300 may further include allowing authentication of the at least one virtual asset on the blockchain by proving access to a blockchain transaction ledger. In an example embodiment, the method 300 may include providing feedback based on adaptive logic, machine learning, and artificial intelligence (AI) trained on historical data. Optionally, the method 300 may further include collecting user data associated with the at least one fan and selling the user data to third party marketers.

Figure 4:
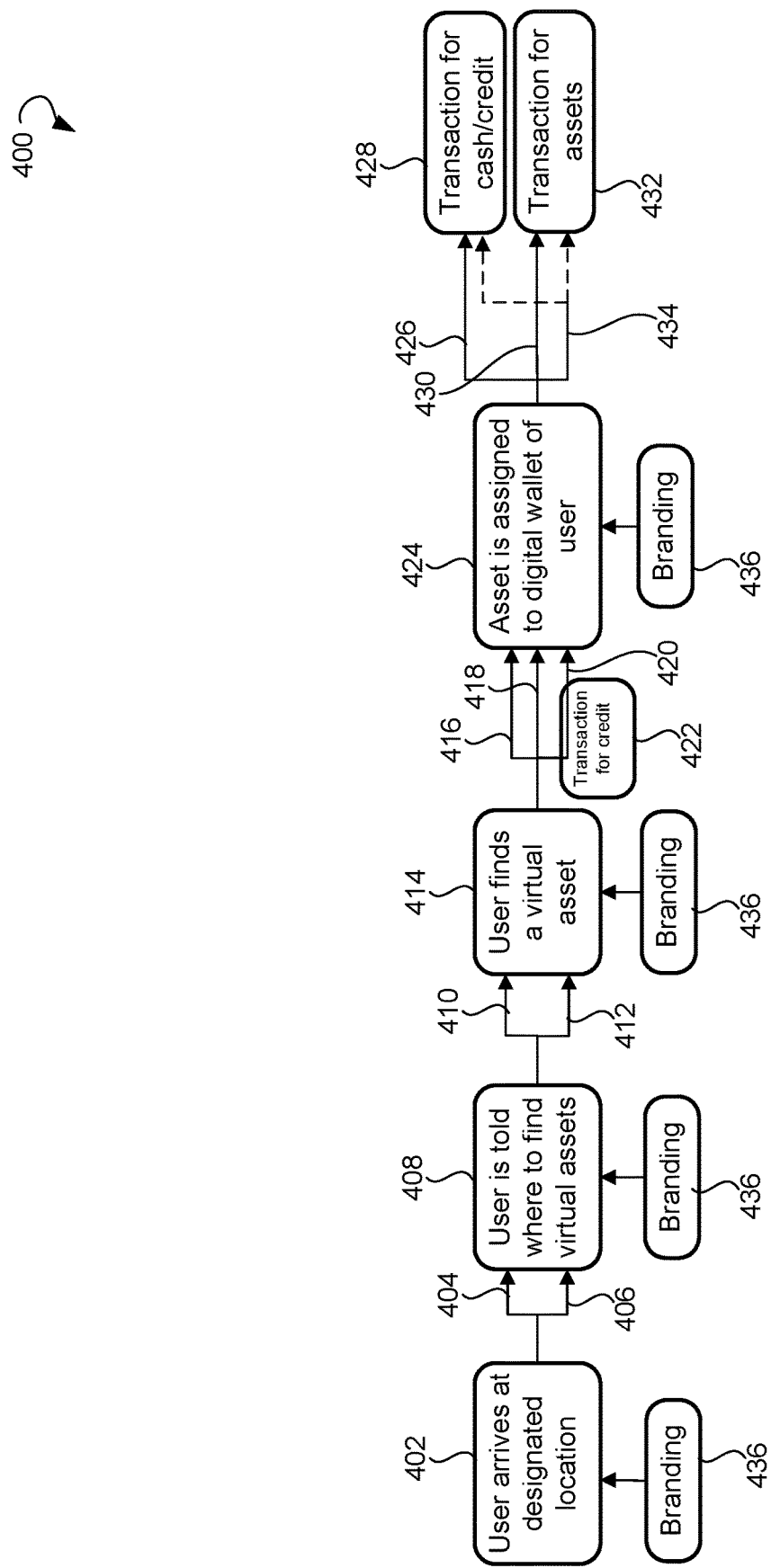
FIG. 4 is a flow diagram illustrating a location-specific interaction of a user with gamified content in real world and awarding a virtual asset to the user, according to an example embodiment.

FIG. 4 is a flow diagram 400 illustrating a location-specific interaction of a user with gamified content in a real world and awarding a virtual asset to the user, according to an example embodiment. In this embodiment, a real world setting with geo-fenced proximity technology, e.g., a Global Positioning System (GPS) and beacons, can be used.

At step 402, the user may arrive at a designated location. Specifically, an AR application may be running on the user device and provide prompts for the user to go to the designated location. At step 404, the user may check-in at the designated location automatically, for example, using a GPS, beacons, and the like. Alternatively, at step 406, the user may check-in at the designated location manually, for example, via a GUI of the AR application.

At step 408, the user may be told where to find virtual assets. Specifically, at step 410, the user may be notified directly, by the AR application, where to find the virtual asset. Alternatively, at step 412, the user may be notified indirectly, for example, by describing a general area of where the virtual asset may be. At step 414, the user may find the virtual asset based on notifications provided in previous steps.

At step 416, the user may receive access to the virtual asset through a gesture such as a tap, a swipe, and the like. Alternatively, at step 418, the user may receive access to the virtual asset through completion of a challenge, for example, by accomplishing a task. In an alternative embodiment, at step 420, the user may receive access to the virtual asset through a payment, for example, by using the in-application currency. Specifically, the user may perform a transaction 422 in order to access a virtual asset.

At step 424, the virtual asset may be assigned to a digital wallet of the user. Upon assigning the virtual asset, the user may have several options with regard to the asset. For example, at step 426, the user may sell the virtual asset to other users via an in-application marketplace. The transaction 428 may be performed to sell the virtual asset. Alternatively, at step 430, the user may trade the asset to other users, for example, via the in-application marketplace. The transaction 432 for the virtual asset can be performed to trade the virtual asset.

In a further alternative embodiment, at step 434, the user can track the value of the virtual asset, for example, by using in-application analysis and monitoring of other users trading or selling their virtual assets of a similar nature. Based on the results of the monitoring, the user may perform the transaction 428 to sell the virtual asset or the transaction 432 to trade the virtual asset.

Furthermore, at steps 402, 408, 414, and 424, branding 436 may be added to the process 400, for example, by providing advertisements to the user.

Figure 5:
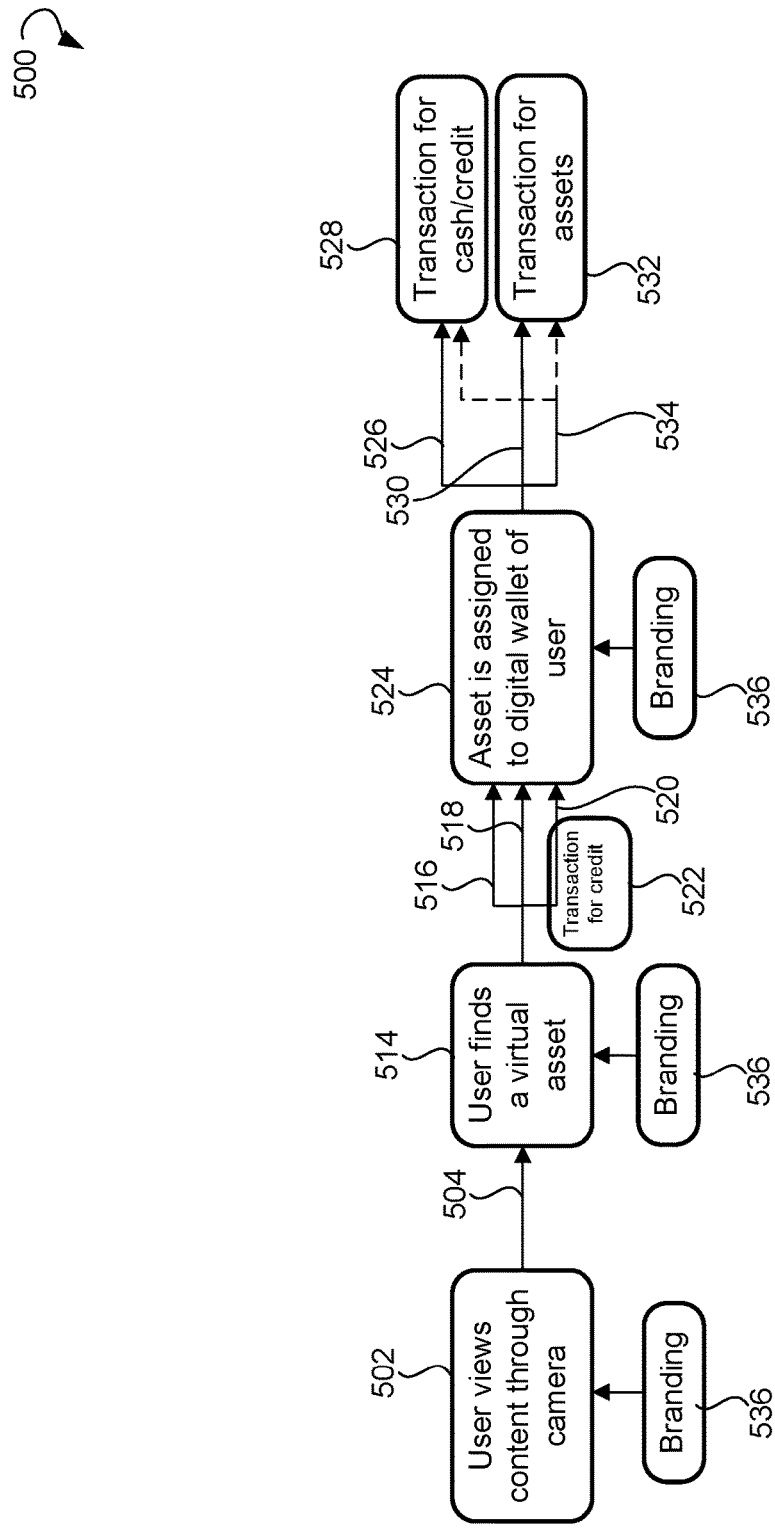
FIG. 5 is a flow diagram illustrating a location-specific interaction of a user with gamified content in a gamified environment and awarding a virtual asset to the user, according to an example embodiment.

FIG. 5 is a flow diagram 500 illustrating a location-specific interaction of a user with gamified content in a gamified environment and awarding a virtual asset to the user, according to an example embodiment. In this embodiment, a digital setting of the gamified environment with embedded hidden trigger images, e.g., QR codes, can be used. At step 502, the user may open the AR application on the user device and view digital content, for example, through a camera of the user device. At step 504, the user may scan the hidden QR code. The QR code may be embedded in an image posted to social media. At step 514, the user may find the virtual asset based on the scanning of the QR code.

The method 500 is similar to the method 400. Specifically, at step 516, the user may receive access to the virtual asset through a gesture provided by the user via the GUI, e.g., a tap, a swipe, and the like. Alternatively, at step 518, the user may receive access to the virtual asset through completion of a challenge, for example, by accomplishing a task. In an alternative embodiment, at step 520, the user may receive access to the virtual asset through a payment, for example, by using the in-application currency. Specifically, the user may perform a transaction 522 for credit to access the virtual asset.

At step 524, the virtual asset may be assigned to a digital wallet of the user. Upon assignment of the virtual asset to the user, the user may have several options on how to use the asset. In particular, at step 526, the user may sell the virtual asset to other users via an in-application marketplace. The transaction 528 for cash and/or credit may be performed to sell the virtual asset. Alternatively, at step 530, the user may trade the asset to other users, for example, via the in-application marketplace. The transaction 532 for the virtual asset may be performed to trade the virtual asset.

In a further alternative embodiment, at step 534, the user can track the value of the virtual asset, for example, via in-application analysis and by monitoring whether other users trade or sell their virtual assets of a similar nature. Based on the results of the monitoring, the user may perform the transaction 528 to sell the virtual asset or the transaction 532 to trade the virtual asset. Furthermore, at steps 502, 514, and 524, branding 536 may be added to the process 500, for example, by providing advertisements to the user.

Figure 6:
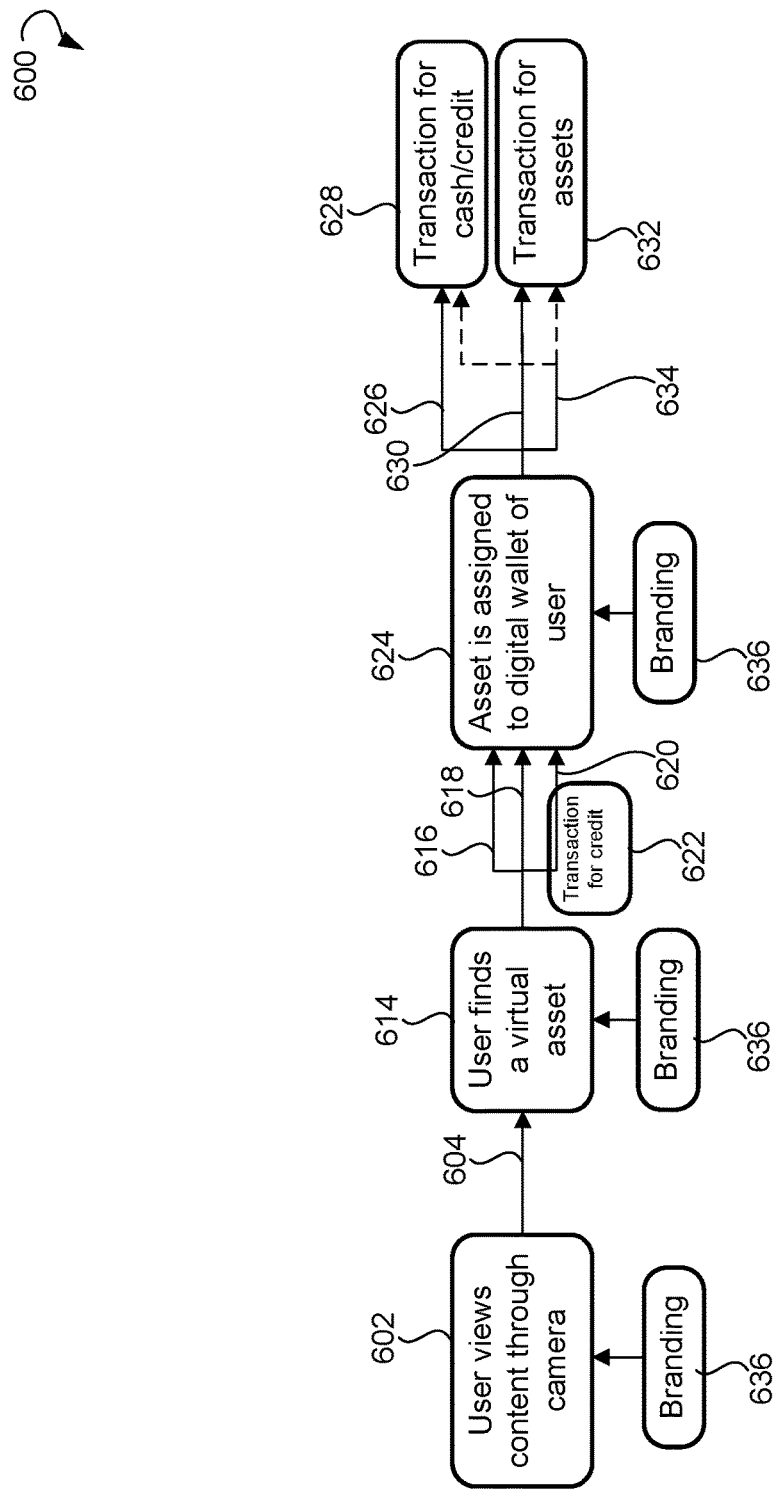
FIG. 6 is a flow diagram illustrating time-sensitive interactions of a user with gamified content in a gamified environment and awarding a virtual asset to the user, according to an example embodiment.

FIG. 6 is a flow diagram 600 illustrating a time-sensitive interaction of a user with gamified content in a gamified environment and awarding a virtual asset to the user, according to an example embodiment. In this embodiment, tasks may be run at set or random intervals throughout a defined length of time. At step 602, the user may open the AR application on the user device at designated time or within a specified timeframe. At step 604, the user may trigger the augmented content, for examples, by locating the user device flat over a surface. At step 614, the user may find a virtual asset.

The method 600 is also similar to the method 500. Specifically, at step 616, the user may receive access to the virtual asset through a gesture provided via the GUI, e.g., a tap, a swipe, and the like. Alternatively, at step 618, the user may receive access to the virtual asset through completion of a challenge, for example, the user may need to accomplish a task. In an alternative embodiment, at step 620, the user may receive access to the virtual asset through payment, for example using the in-application currency. Specifically, the user may perform a transaction 622 for credit to access the virtual asset.

At step 624, the virtual asset may be assigned to a digital wallet of the user. Upon assigning the virtual asset to the user, the user may have several options on how to use the asset. In particular, at step 626, the user may sell the virtual asset to other users, for example, via an in-application marketplace. The transaction 628 for cash and/or credit may be performed to sell the virtual asset. Alternatively, at step 630, the user may trade the asset to other users, for example, via the in-application marketplace. The transaction 632 for the virtual asset may be performed to trade the virtual asset.

In a further alternative embodiment, at step 634, the user can track the value of the virtual asset, for example, via in-application analysis and by monitoring whether other users trade or sell their virtual assets or a similar nature. Based on the results of the monitoring, the user may perform the transaction 628 to sell the virtual asset or the transaction 632 to trade the virtual asset. Furthermore, at steps 602, 614, and 624, branding 636 can be added to the process 600, for example, by providing advertisements to the user.

Figure 7:
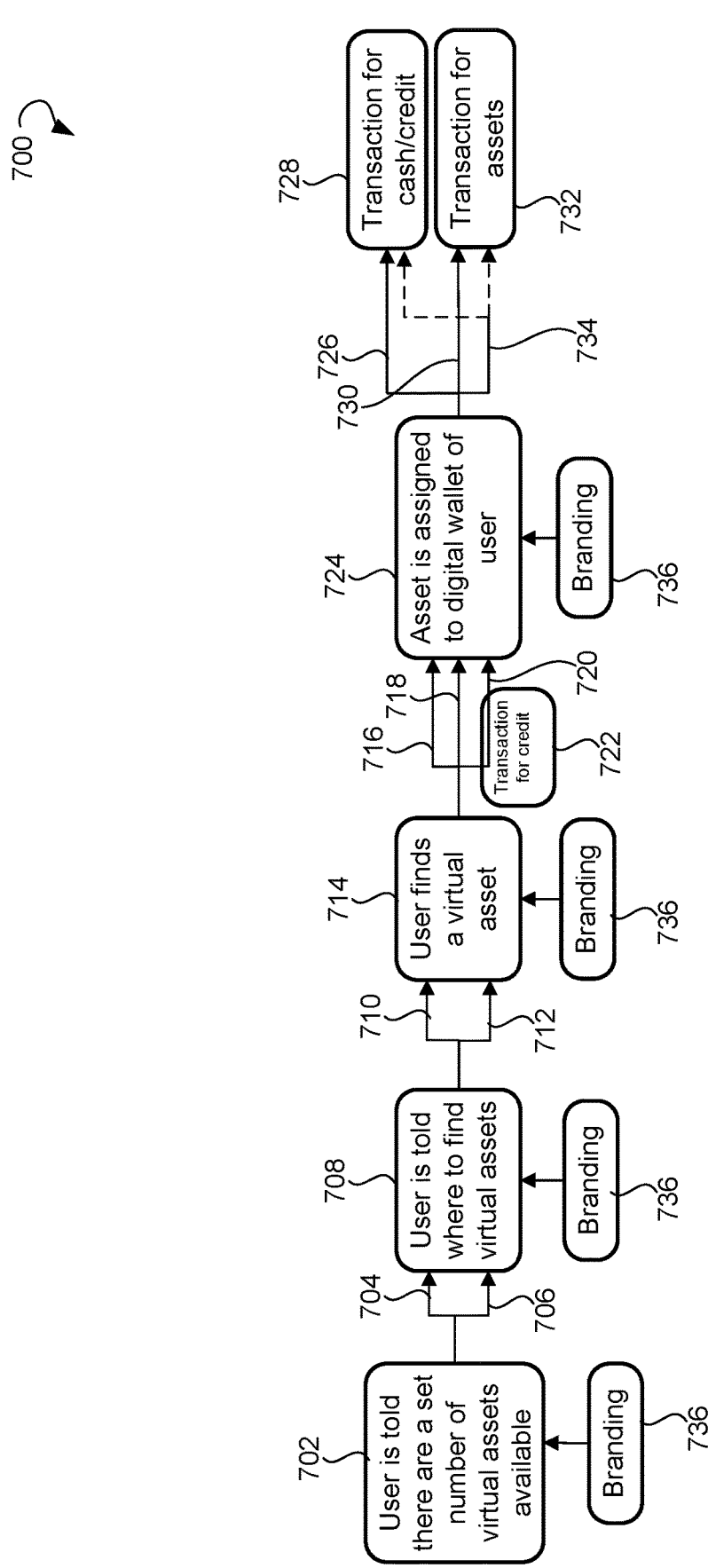
FIG. 7 is a flow diagram illustrating a location-specific interaction of a user with gamified content and awarding a virtual asset to the user, according to an example embodiment.

FIG. 7 is a flow diagram 700 illustrating a location-specific interaction of a user with gamified content and awarding a virtual asset to the user, according to an example embodiment. In this embodiment, the virtual assets are limited in quantity to increase the demand and drive the value of the virtual assets up. At step 702, the user may be told that there are only a set number of virtual assets available. Specifically, an AR application may be running on the user device and provide a notification to the user. At step 704, the user may be made aware of the quantity. For example, the user may be informed of the exact number of virtual assets available. Alternatively, at step 706, the user may be not told of the quantity of the virtual assets. Thus, the user may be unsure of how many virtual assets are available in total.

The method 700 can then proceed similarly to the method 400. At step 708, the user may be told where to find virtual assets. Specifically, at step 710, the user may be told directly, by providing a notification by the AR application showing or informing the user of where to find the virtual asset. Alternatively, at step 712, the user may be told indirectly, for example, by providing a notification describing a general area of where the virtual asset may be. At step 714, the user may find the virtual asset based on notifications provided to the user at previous steps.

At step 716, the user may receive access to the virtual asset through a gesture provided by the user via the GUI, e.g., a tap, a swipe, and the like. Alternatively, at step 718, the user may receive access to the virtual asset through completion of a challenge, for example, the user may need to accomplish a task. In an alternative embodiment, at step 720, the user may receive access to the virtual asset through payment, for example, by using the in-application currency. Specifically, the user may perform a transaction 722 for credit to access the virtual asset.

At step 724, the virtual asset may be assigned to a digital wallet of the user. Upon assignment of the virtual asset to the user, the user may have several options on how to use the asset. For example, at step 726, the user may sell the virtual asset to other users via an in-application marketplace. The transaction 728 for cash and/or credit may be performed to sell the virtual asset.

Alternatively, at step 730, the user may trade the asset to other users, for example, via the in-application marketplace. The transaction 732 for the virtual asset may be performed to trade the virtual asset. In a further alternative embodiment, at step 734, the user can track the value of the virtual asset, for example, via in-application analysis and by monitoring other users trading or selling their virtual assets of a similar nature. Based on the results of the monitoring, the user may perform the transaction 728 to sell the virtual asset or the transaction 732 to trade the virtual asset. Furthermore, at steps 702, 708, 714, and 724, branding 736 may be added to the process 700, for example, by providing advertisements to the user.

In an example embodiment, a hybrid experience may be provided to the user by combining elements of methods 400, 500, 600, and 700, such as specific location, designated time, limited quantity, and so forth.

Figure 8:
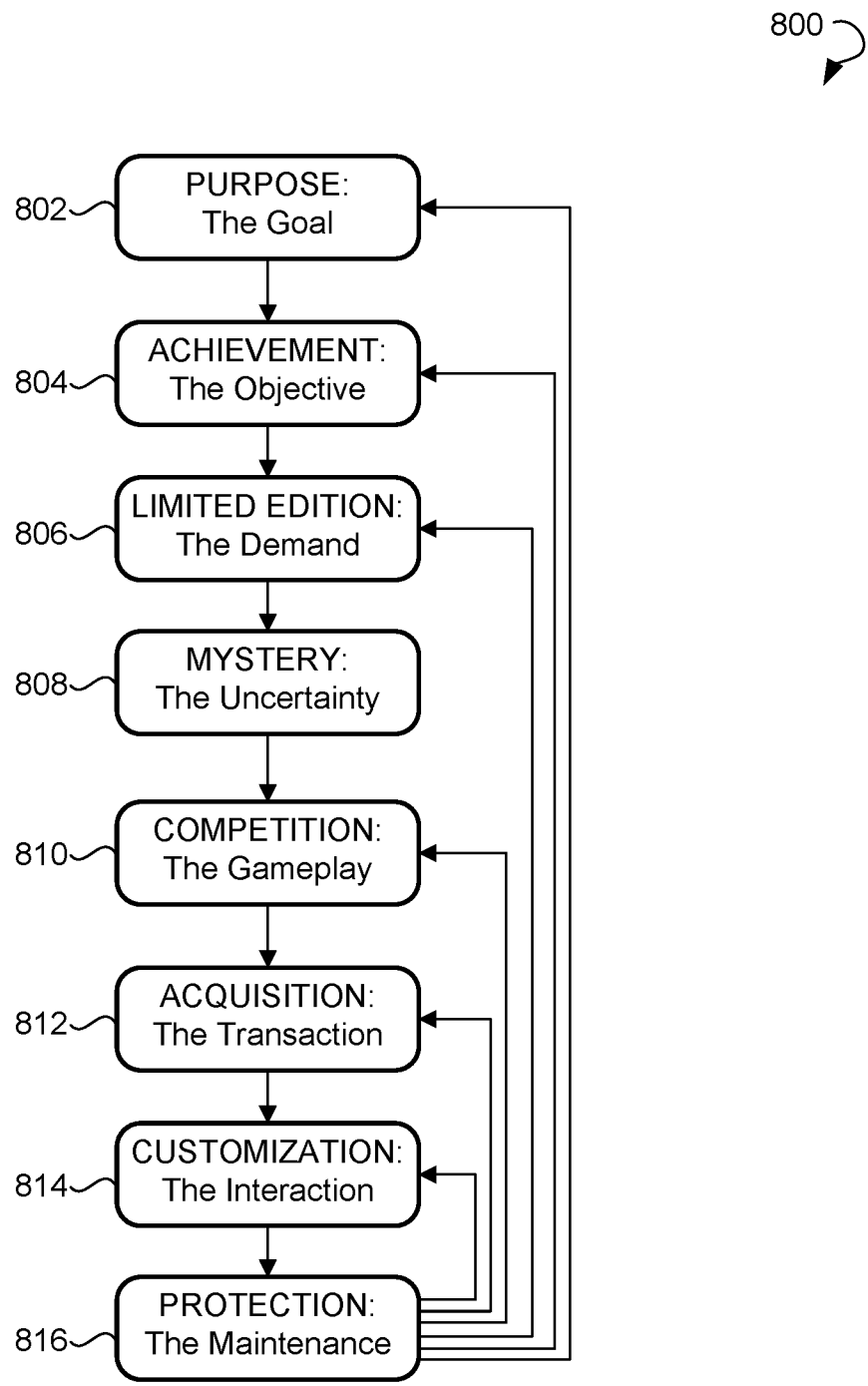
FIG. 8 is a block diagram illustrating a process for facilitating interactions of the user with the gamified content, according to an example embodiment.

FIG. 8 is a block diagram illustrating a process 800 for facilitating interactions of the user with the gamified content, according to an example embodiment. The process 800 may apply a gaming model that is a modified version of the Octalysis gaming model, with the monetization opportunities available at each step. The Octalysis gaming model is a human-centric gamification design framework that lays out eight core drives for motivation of a user. Some steps may be monetized solely through branding, while other steps may be monetized via in-application transaction (i.e., paying to purchase in-application currency which can then be used to acquire virtual assets).

Step 802 relates to the purpose, or the goal, which is the underlying reason why the user is involved in the gamified environment, namely, to obtain the virtual assets. At step 802, the user may be motivated by the fondness for the affiliated icon and the sense of belonging to a community built around the icon.

Step 804 relates to the achievement, or the objective, which is how the user gets to the goal, i.e., various steps to unlocking the virtual assets. At this step, the user is further motivated by the desire to "Level Up" or unlock otherwise hidden or inaccessible content, as well as earn rewards to be used on product discounts.

Steps 802 and 804 of the process 800 provide the following monetization opportunities. The affiliated brand, marketer, agency, or influencer may pay to feature the branding on the introductory screens shown to the user, and the user may be introduced to the purpose of the platform, namely, to acquire virtual assets that are of meaning to the user because of the association of the virtual asset with an icon (athlete, musician, actor, author, celebrity, etc.).

Step 806 relates to the demand, or the value, which is how the limiting availability of the virtual assets drives the value of the virtual assets. At step 806, the user may be ultimately motivated by the limited availability of the virtual assets so that the supply/demand dynamics may drive the user to seek out the virtual assets to first acquire the virtual assets, and then use the scarcity of the virtual assets to trade/sell the virtual assets via an in-application marketplace. At this step, the affiliated brand, marketer, agency, or influencer may pay to feature their products in the form of the virtual assets (in limited quantities/distributed over great distances/at a high cost of acquisition/some other manner to drive up initial value and user interest), which can then be collected, traded, and sold by the user within the platform.

Step 808 relates to the mystery, or the uncertainty, that provides a level of intrigue to the user experience to make the user experience not so straightforward or boring for the user. At step 808, the user may be unsure exactly what virtual asset the user is unlocking, so there is a sense of mystery about the process as the user tries to acquire all virtual assets without knowing for sure where and/or when to find the virtual assets. At this step, the affiliated brand, marketer, agency, or influencer may pay to feature the branding on the introductory screens, where the user may be introduced to the purpose of the platform, namely, to acquire virtual assets that are of meaning to the user because of their association with an icon.

Step 810 includes the competition, or the gameplay, though which the user may be matched against one another to challenge for the virtual asset. At this step, the user may be driven by what other users are doing. For example, there may be a level of competitive nature built into acquiring limited virtual assets when the user may want to acquire all available virtual assets. The affiliated brand, marketer, agency, or influencer may also pay to feature the products and iconography throughout the quest of the user to obtain the virtual assets.

Step 812 relates to the acquisition, or the transaction, by which the user may either receive the virtual assets with little to no effort, the user may be required to earn the virtual assets by completing the gameplay, or the user may purchase the virtual assets by using in-application currency (which may be paid for with real-world currency). At this step, the user may be additionally motivated by the want to acquire the sought-after virtual assets, made even more desirable because of the limited availability of the virtual assets. The user may contribute payment at this stage, in order to acquire the virtual assets through payment of in-application currency, which the user can either pay for using real world cash or earn through in-app challenges.

Step 814 includes the customization, or the interaction, which means how the user engages with the virtual asset once the user has acquired the virtual asset. At step 814, the user may be empowered to create and customize the personalized experience of the user using the available virtual assets. The affiliated brand, marketer, agency, or influencer may pay for various features and/or options from which the user can select or which the user can use to customize the user experience.

Step 816 relates to the protection, or the maintenance, of the virtual assets that enables the user to ensure that the value of the virtual asset remains steady, or even increases over time. At this step, the user is driven by the unwillingness to lose the virtual asset. Therefore, once the user acquires the virtual asset, the user may do everything the user can to ensure the user holds on to the virtual asset until the user is ready to sell the virtual asset. The user can increase the value of the virtual assets the longer the user holds the virtual asset because the market demand increases. In-application tools may be used to maintain the integrity of the virtual assets.

Thus, the gaming model illustrated by the process 800 provides the gamified user experience and activates all revenue streams, such as in-application purchases, in-application subscriptions, in-application advertising, digital collectibles (virtual assets), sponsorships, and the like. The process 800 further includes providing in-application competitions to facilitate interactions of the user with the gamified content, such as head-to-head competitions (activities that pit users against other users in direct competition), check-in streaks (where users who repeatedly check-in may be rewarded for doing so), trivia (answering questions related to the icon or other game related aspects), and so forth.

The process 800 further involves sweepstakes and contests, such as content creation judged by other users, content creation judged by the icon, leaderboards (where individual achievements are ranked and the top performers are rewarded), and so forth.

The process 800 may further include providing digital scavenger hunts that may require users to locate virtual assets hidden in the real world, e.g., on store signage, or hidden in the digital world, e.g., in an Instagram post.

The user experience may be driven by a reward system that may perpetuate activity loops and desired actions and offer users in-application purchases, in-application advertising, in-application subscriptions, as well as other revenue streams.

The reward system may provide a plurality of reward to the user. The rewards may include digital status symbols (e.g., experience points, badges, reputation score, subsequently leaderboards), digital collectibles, real world rewards, validation and acceptance from the icon (measured based on tracking of the interaction, correspondence, and other exchanges between the user and the icon), and so forth. The access to these rewards (both earned or paid) can be increased and improved upon utilizing a gaming mechanism, for example, through in-application earned power boosts (via continued engagement/gameplay) or through in-application paid purchases (via acquisitions made with digital currencies).

The virtual assets may have a plurality of options. In case of experience points, the user can accumulate the experience points in order to increase the level of the user in the application (higher levels provide additional benefits and features). Furthermore, the user can accumulate reputation points in order to increase the social status of the user in the application (higher reputation provides access to the icon). Tickets may be used to access certain features of the application (if the user does not possess enough tickets, the user cannot engage with the particular feature or content). The users may be able to earn in-application currency in the form of tickets, which can be redeemed for certain activities and actions within the application.

Coins may be the in-application currency, with which the user can acquire other virtual assets (coins can be purchased with real world currency). Therefore, the user can also earn in-application currency in the form of coins (or other to-be-named digital currency), which can be redeemed for acquiring lockers and virtual assets.

Both forms of in-application currency (tickets and coins) can be earned by performing a certain task within the application, by achieving a set of objectives, or through purchase (using real world legal tender). The real world currency may not be used within the application except to purchase in-application currency.

The virtual assets may further include digital still images, for example, photographs, digital illustrations, three-dimensional (3D) renderings, AR content, and so forth. The virtual assets may further include digital moving images, for example, videos, animations, 3D content, AR content, and so forth. The virtual assets may further include audio, for example, voiceovers, music, or other sounds, and text, for example, informative copy, educational content, descriptions, captions, AR content, and so forth. The virtual assets may further include codes, with which the user can acquire other virtual assets or which may be redeemed towards purchase of real world items. The virtual assets may also include boosters that are add-ons that can increase the other rewards earned by the user (experience points, reputation points, tickets, coins, and so forth).

The virtual assets may be available in whole or in part. For example, the user may need to acquire the virtual asset incrementally, so the user may need to acquire all the fragments (also referred herein as 'shards') of the asset before the asset is available or unlocked. In the shard model (i.e., incremental accumulation of the virtual asset), there may be a progress monitor or a progress meter built into the GUI to indicate how much of the virtual asset the user has acquired and how much the user still needs to do. The progress of the user can be indicated through a progress bar, tick marks, percentage, and so forth.

The blockchain-based platform for monetizing a social media following may be licensed to icons, influencers, celebrities, fictional characters, athletes, gamers, musicians, movie stars, TV stars, and to anyone who has fandom, i.e. a passionate and dedicated fan base.

Figure 9:
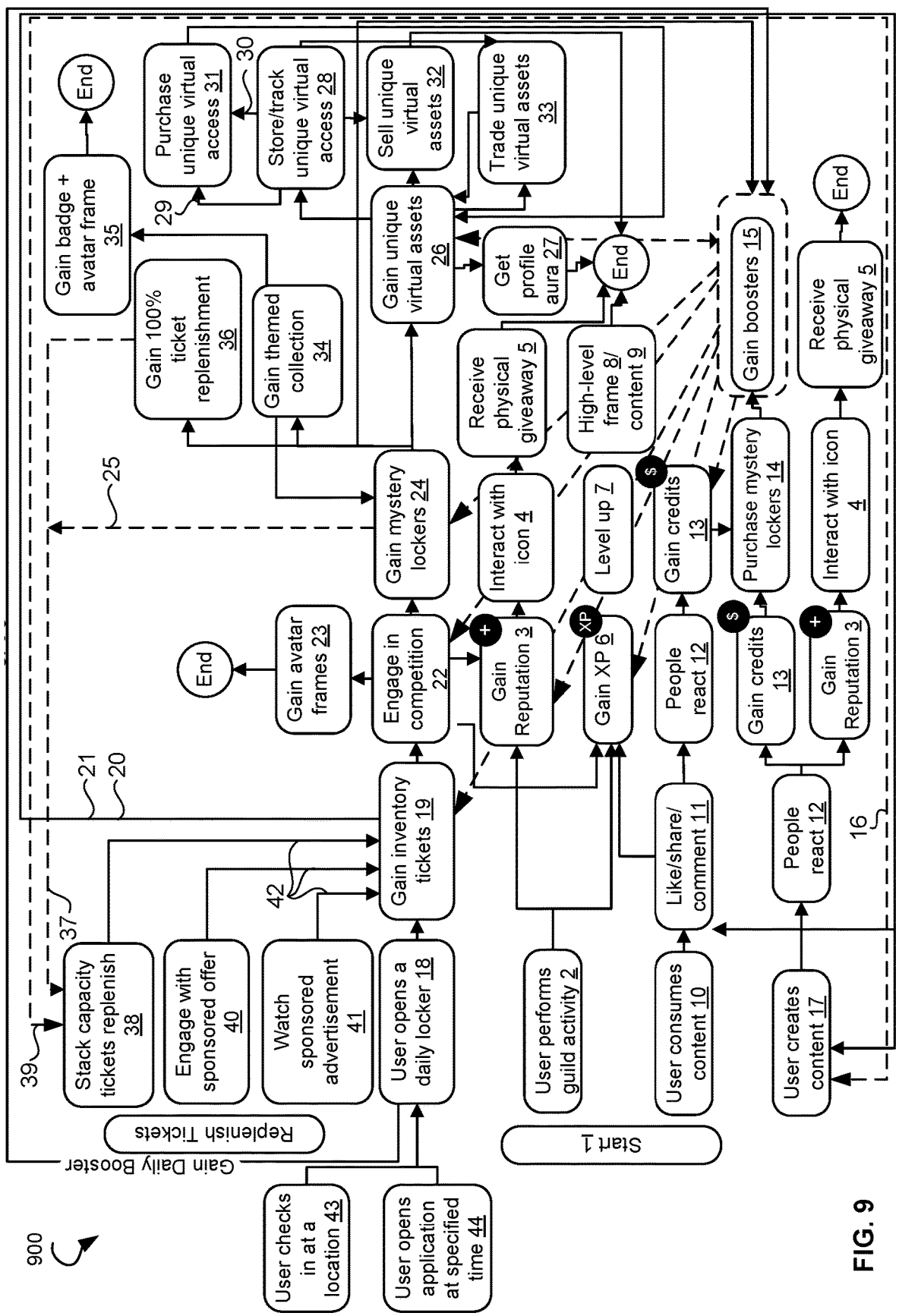
FIG. 9 shows a blockchain-based method for monetizing a social media following, according to an example embodiment.

FIG. 9 shows a blockchain-based method 900 for monetizing a social media following, according to an example embodiment. The process 900 starts at step 1 with a user opening an application on a user devices and seeing a home page/landing page. At step 2, the user can perform any team-based/guild-based activity. Based on the activity, the user can earn reputation at step 3, which increases standing of the user within the community. As the reputation of the user increases, the user may be provided with more and more opportunities to interact/meet with the icon at step 4. Each meeting/interaction of the user with the icon may conclude with the icon presenting the user with a physical giveaway (e.g., a souvenir) at step 5. At step 6, the user may also receive experience for the user activity. Gaining the experience enables the user to level up to higher levels at step 7. This may result in rewarding new high-level frames for a photo of the user in an in-application user profile at step 8 or rewarding high-level content to the user at step 9.

At step 10, the user has an option to engage with/consume in-application content (e.g., read articles, watch videos, etc.). At step 11, as the user provides likes, shares, and/or comments on the content, the user may gain experience, as in step 6, and the experience can be used to level up, as in step 7. At step 12, other users can react to the activity of the user (likes, shares, and/or comments). The user can gain credit for the reactions from other users at step 13. At step 14, these credits can be used to purchase mystery lockers within the application. The mystery lockers can contain boosters, which can increase the output of certain processes at step 15: gaining experience, earning credit, receiving tickets, gaining reputation, accessing competitions, receiving mystery lockers, and so forth. At step 16, at a certain level ("level X"), premium content and exclusive features may be unlocked for the user.

At step 17, once the level X is unlocked, the user may receive the ability to create and post content. When users react as in step 12, the user may gain credits as in step 13. The credits may be used to purchase mystery lockers, as in step 14, in order to gain boosters as in step 15. Additionally, as other users react to the content of the user, the user may gain reputation, as in step 3. The higher the reputation is, the greater the opportunity to interact directly with the icon is, as in step 4, so that the user can receive the exclusive assets directly from the icon in person, as in step 5.

At step 18, the user may also open a daily locker, which may provide access to a daily booster similar to step 15. At step 19, opening of the daily locker may provide the user with more tickets of a random number, but no more than the stack capacity of tickets. At step 20, the user may use the tickets to create content, which may gain a booster for the user, as in step 15. At step 21, the user may use the tickets to like, share, and/or comment existing content, which may gain the user a booster, as in step 15. At step 22, the user may engage in a competition through in-application challenges (some of the challenges may be with other users in team challenges, or against other users in head-to-head challenges). By engaging in the challenges, the user may gain avatar frames which can be used by the user to dress up the profile photo at step 23. Furthermore, by engaging in the challenges, the user can gain mystery lockers at step 24. At step 25, the mystery lockers can contain items relayed to the current level of the user (higher levels may unlock higher tier items). The mystery lockers can contain unique virtual assets, which the user can gain at step 26. Using the virtual assets, the user can enhance the profile aura at step 27. Once the user has acquired the virtual asset, the user can store the virtual asset in the virtual bank/wallet and track the value of the virtual asset within the application community at step 28 (as similar assets are sold and/or traded by other users). The user may exchange the in-application currency (e.g., credits) at step 29 or exchange the real world legal tender (e.g., USD, $) at step 30 to purchase virtual assets at step 31. At step 32, the user can also sell the assets the user has acquired. In addition, the user can trade the virtual assets with each other in an in-application marketplace at step 33. Performing any of steps 30, 31, or 32 will return the user to step 26, where the user can gain unique virtual assets.

The mystery lockers can contain themed digital collectibles so that the user may gain themed collections at step 34. These themed collectibles may also provide the user with a badge to display and a frame for the avatar of the user at step 35.

The mystery lockers can contain a 100% token replenish booster so that the user can gain 100% ticket replenishment at step 36. This may automatically restore the token capacity of the user to the maximum value at step 37 when the booster is used.

The maximum token value is referred to as the stack capacity and the replenish speed is a restriction on how long it takes before the user can replenish the depleted token stash at step 38. The stack capacity, along with the replenish speed, may both increase at step 39 each time the user levels up.

At step 40, the user can receive tickets by engaging with sponsored offers. At step 41, the user can also receive tickets by watching advertised videos. At step 42, the tickets received at steps 38, 40, and 41 can be combined with the tickets received at step 19 for opening a daily locker as in step 18. In order to access the daily lockers, the user may be required to check in within a certain geographic area at step 43. Likewise, in order to access the daily lockers, the user may be required to access the application at a specific time (or within a dedicated timeframe) at step 44.

Figure 10:
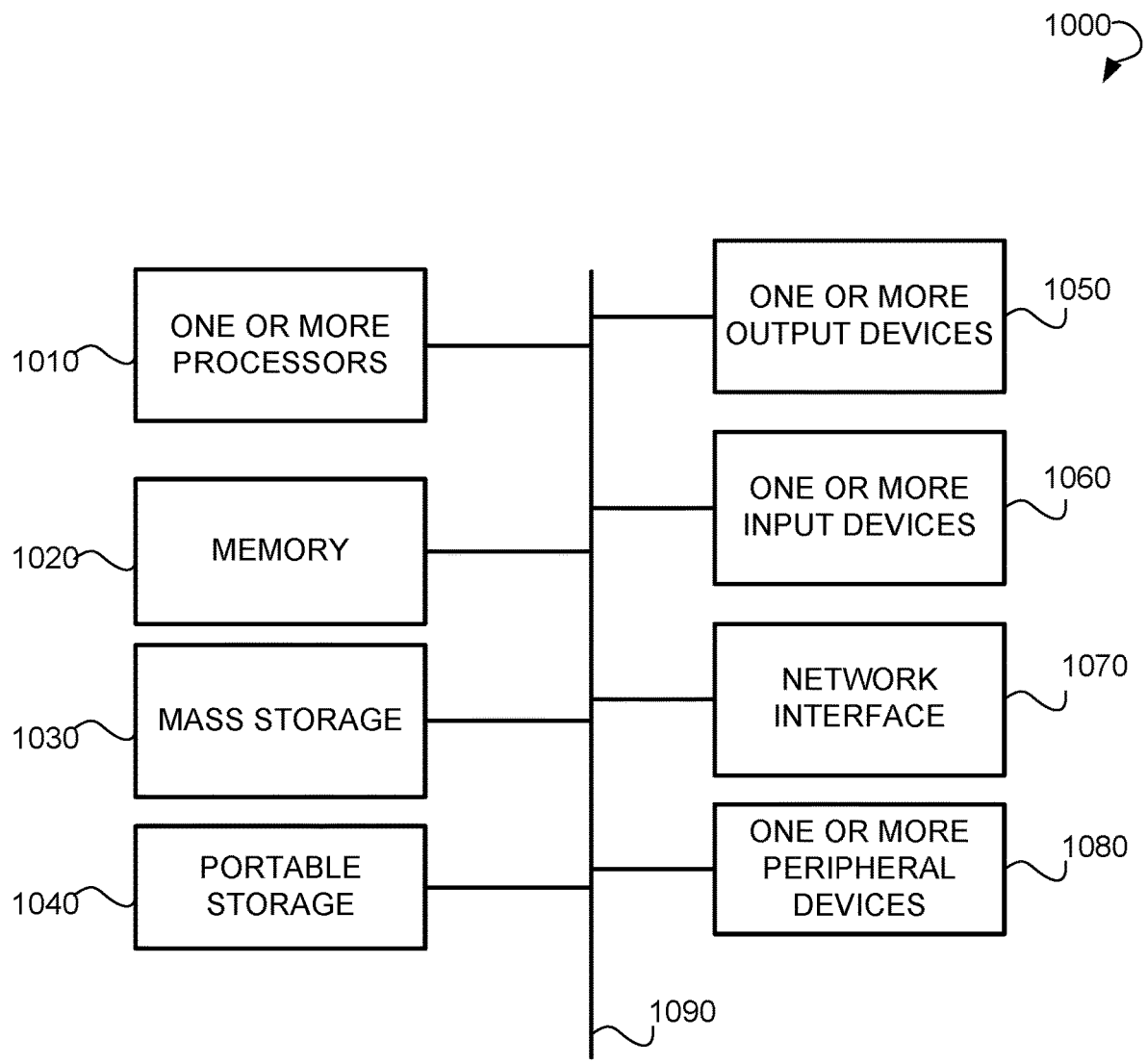
FIG. 10 shows a computing system that can be used to implement a method for executing a case based on a barcode detected in a video feed, according to an example embodiment.

FIG. 10 illustrates an exemplary computing system 1000 that may be used to implement embodiments described herein. The exemplary computing system 1000 of FIG. 10 may include one or more processors 1010 and memory 1020. Memory 1020 may store, in part, instructions and data for execution by the one or more processors 1010. Memory 1020 can store the executable code when the exemplary computing system 1000 is in operation. The exemplary computing system 1000 of FIG. 10 may further include a mass storage 1030, portable storage 1040, one or more output devices 1050, one or more input devices 1060, a network interface 1070, and one or more peripheral devices 1080.

The components shown in FIG. 10 are depicted as being connected via a single bus 1090. The components may be connected through one or more data transport means. The one or more processors 1010 and memory 1020 may be connected via a local microprocessor bus, and the mass storage 1030, one or more peripheral devices 1080, portable storage 1040, and network interface 1070 may be connected via one or more input/output buses.

Mass storage 1030, which may be implemented with a magnetic disk drive or an optical disk drive, is a non-volatile storage device for storing data and instructions for use by a magnetic disk or an optical disk drive, which in turn may be used by one or more processors 1010. Mass storage 1030 can store the system software for implementing embodiments described herein for purposes of loading that software into memory 1020.

Portable storage 1040 may operate in conjunction with a portable non-volatile storage medium, such as a compact disk (CD) or digital video disc (DVD), to input and output data and code to and from the computing system 1000 of FIG. 10. The system software for implementing embodiments described herein may be stored on such a portable medium and input to the computing system 1000 via the portable storage 1040.

One or more input devices 1060 provide a portion of a user interface. The one or more input devices 1060 may include an alphanumeric keypad, such as a keyboard, for inputting alphanumeric and other information, or a pointing device, such as a mouse, a trackball, a stylus, or cursor direction keys. Additionally, the computing system 1000 as shown in FIG. 10 includes one or more output devices 1050. Suitable one or more output devices 1050 include speakers, printers, network interfaces, and monitors.

Network interface 1070 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1070 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1080 may include any type of computer support device to add additional functionality to the computing system. The one or more peripheral devices 1080 may include a modem or a router.

The components contained in the exemplary computing system 1000 of FIG. 10 are those typically found in computing systems that may be suitable for use with embodiments described herein and are intended to represent a broad category of such computer components that are well known in the art. Thus, the exemplary computing system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, a blockchain-based platform for monetizing a social media following blockchain-based and methods for monetizing a social media following are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A blockchain-based platform for monetizing a social media following, the platform comprising:
a processor including at least a content aggregation module, a gamifying module, an award module, and a blockchain module;
a memory for storing instructions executable by the processor;
wherein the content aggregation module is configured to:
receive content associated with an object of a social media following, the content being received from at least one content source, the at least one content source being external with respect to a user device associated with at least one fan of the object of the social media; and
aggregate the content received from the at least one content source;
wherein the gamifying module is configured to:
gamify the aggregated content received from the content aggregation module to facilitate interactions of the at least one fan of the object of the social media following with the aggregated content, wherein the gamifying includes customizing an activity environment for the at least one fan by creating, based on the aggregated content associated with the object of the social media following, a game related to the object of the social media following, wherein the game includes at least one of the following: a trivia game, a digital scavenger hunt, a digital challenge, a contest, a microgame, a head-to-head competition, a check-in streaks, and a sweepstake;
determine that a location of the user device matches a predefined location cached in the memory, the predefined location being associated with a code, the code being located at the predefined location and being a trigger to launch the game;
based on the determination that the location matches the predefined location, prompt the at least one fan to capture, via a camera of the user device, the code at the predefined location;
receive, from the user, the code captured via the camera of the user device;
based on the receiving the code, trigger launching the game by presenting the game to the user via a graphical user interface associated with the user device, wherein the at least one fan interacts with the aggregated content by interacting with the game in the activity environment via the graphical user interface;
wherein the award module is configured to:
while presenting the game, track, via the graphical user interface, the interactions of the at least one fan with the game;
analyze traffic consumption associated with the interactions of the at least one fan with the game;
analyze consumption of the aggregated content by the at least one fan during the interactions of the at least one fan with the game;
analyze responses provided by one or more of a plurality of fans to the interactions of the at least one fan with the game;
based on the interactions, the traffic consumption, the consumption of the aggregated content, and the responses provided by the one or more of the plurality of fans to the interactions of the at least one fan with the game, determine, in real time, engagement metrics associated with the interactions of the at least one fan with the game;
analyze overall traffic consumption associated with interactions of the plurality of fans with the game;
establish that the overall traffic consumption is lower that a predetermined threshold;

based on the establishing and the engagement metrics, dynamically change a reward to the at least one fan for interacting with the game in the activity environment to further facilitate the interactions of the at least one fan with the game, the reward including at least one virtual asset;

award the at least one virtual asset to the at least one fan based on the interactions with the game; and facilitate exchange of the at least one virtual asset for a currency; and wherein the blockchain module is configured to securely store transactions associated with the at least one virtual asset; and a global positioning unit associated with the user device, wherein the global positioning unit is configured to determine the location of the user device.

2. The platform of claim 1, further comprising an augmented reality (AR) enabled user device associated with the at least one fan, the AR enabled user device being configured to:

run an AR application; and enable the at least one fan to capture physical objects via the AR application to obtain the at least one virtual asset.

3. The platform of claim 1, further comprising:

an artificial intelligence (AI) module configured to be trained on historical data associated with one or more of the following: the at least one fan and the object of the social media following; and a machine learning module configured to be trained on the historical data.

4. The platform of claim 1, wherein the object of the social media following includes at least one of the following: an icon, an influencer, an athlete, a musician, a TV star, a movie actor, an author, a celebrity, and a fictional character.

5. The platform of claim 1, wherein the interactions include a bilateral connection between the at least one fan and the object of the social media following.

6. The platform of claim 1, wherein the at least one content source includes one or more of the following: an external source, original content associated with the object of the social media following, a platform administrator, and social media.

7. The platform of claim 1, wherein the at least one virtual asset includes one or more of the following: a digital status symbol, an experience point, a reputation point, a ticket, a coin, a digital image, a video, a text, the code, a booster, a badge, a reputation score, a leaderboards, a digital collectible, a mystery box, and a real world award.

8. The platform of claim 1, wherein the transactions include one or more of the following: trading, sharing, buying, selling, redeeming, gifting, storing, and transferring of the at least one virtual asset.

9. The platform of claim 1, wherein the at least one virtual asset is acquired incrementally before the at least one virtual asset is available for an exchange.

10. The platform of claim 1, wherein the interactions are measured based on consumer usage.

11. The platform of claim 1, wherein the at least one virtual asset is part of a set, the at least one virtual asset increasing in value once the set is collected by the at least one fan.

12. The platform of claim 1, wherein the at least one virtual asset is geo-cached, thereby limiting ability to collect the at least one virtual asset to specific locations.

13. The platform of claim 1, wherein the gamifying the aggregated content includes engaging the at least one fan in at least one game activity, wherein the at least one fan is to collect awards based on performance of the at least one game activity.

14. The platform of claim 13, wherein the at least one game activity includes: a digital scavenger hunt, answering trivia questions, participating in a digital challenge, in-application purchases, in-application subscriptions, in-application advertising, collection of digital collectibles, sponsorships, in-application challenges, content creation judged by other users, content creation judged by the object of the social media following, and leaderboards.

15. The platform of claim 13, wherein the gamifying the aggregated content includes customizing an environment of the at least one fan based on personal data and historical interaction data.

16. The platform of claim 1, wherein the content is validated and acknowledged by the object of the social media following.

17. The platform of claim 1, wherein the at least one virtual asset is configured for access via the code, the code including a visible code or an embedded Quick Response (QR) code viewed via an application associated with a platform for monetizing a social media following.

18. The platform of claim 17, wherein the visible code or the embedded QR code is associated with physical real world objects or virtual objects.

19. The platform of claim 1, wherein the at least one virtual asset is digitally associated with map locations.

20. The platform of claim 1, wherein the at least one virtual asset is obtained by capturing physical objects via an AR application.

21. A blockchain-based method for monetizing a social media following, the method comprising:

receiving, by a content aggregation module, content associated with an object of a social media following, the content being received from at least one content source, the at least one content source being external with respect to a user device associated with at least one fan of the object of the social media;

aggregating, by the content aggregation module, the content received from the at least one content source;

gamifying, by a gamifying module, the aggregated content received from the content aggregation module to facilitate interactions of the at least one fan of the object of the social media following with the aggregated content, wherein the gamifying includes customizing an activity environment for the at least one fan by creating, based on the aggregated content associated with the object of the social media following, a game related to the object of the social media following, wherein the game includes at least one of the following: a trivia game, a digital scavenger hunt, a digital challenge, a contest, a microgame, a head-to-head competition, a check-in streaks, and a sweepstake;

determining, via a global positioning unit associated with the user device, a location of the user device;

determining, by the gamifying module, that the location matches a predefined location cached in a memory, the predefined location being associated with a code, the code being located at the predefined location and being a trigger to launch the game;

based on the determination that the location matches the predefined location, prompting the at least one fan to capture, via a camera of the user device, the code at the predefined location;

receiving, by the gamifying module, from the user, the code captured via the camera of the user device;

based on the receiving the code, triggering launching the game by presenting, by the gamifying module, the game to the user via a graphical user interface associated with the user device, wherein the at least one fan interacts with the aggregated content by interacting with the game in the activity environment via the graphical user interface;

while presenting the game, tracking, by an award module, via the graphical user interface, the interactions of the at least one fan with the game;

analyzing, by the award module, traffic consumption associated with the interactions of the at least one fan with the game;

analyzing, by the award module, consumption of the aggregated content by the at least one fan during the interactions of the at least one fan with the game;

analyzing, by the award module, responses provided by one or more of a plurality of fans to the interactions of the at least one fan with the game;

based on the interactions, the traffic consumption, the consumption of the aggregated content, and the responses provided by the one or more of the plurality of fans to the interactions of the at least one fan with the game, determining, in real time, by the award module, engagement metrics associated with the interactions of the at least one fan with the game;

analyzing, by the award module, overall traffic consumption associated with interactions of the plurality of fans with the game;

establishing, by the award module, that the overall traffic consumption is lower that a predetermined threshold;

based on the establishing and the engagement metrics, dynamically changing, by the award module, a reward to the at least one fan for interacting with the game in the activity environment to further facilitate the interactions of the at least one fan with the game, the reward including at least one virtual asset;

awarding, by the award module, the at least one virtual asset to the at least one fan based on the interactions with the game;

securely storing transactions associated with the at least one virtual asset to a blockchain; and facilitating, by the award module, exchange of the at least one virtual asset for a currency.

22. The method of claim 21, further comprising limiting a number of the at least one virtual asset to create scarcity and increase demand.

23. The method of claim 22, further comprising providing a valuation of the at least one virtual asset based on the scarcity of the at least one virtual asset as verified via a blockchain transaction ledger.

24. The method of claim 21, further comprising allowing authentication of the at least one virtual asset on the blockchain by proving access to a blockchain transaction ledger.

25. The method of claim 21, further comprising allowing redeeming the at least one virtual asset for real world value.

26. The method of claim 21, further comprising providing feedback based on one or more of the following: adaptive logic, machine learning, and artificial intelligence (AI), wherein the adaptive logic, the machine learning, and the AI are trained on historical data.

27. The method of claim 21, further comprising incentivizing the interactions of the at least one fan with the game by dynamically increasing awards for the interactions with underperforming content.

28. The method of claim 21, further comprising awarding the at least one fan with an in-application currency, the in-application currency being redeemable for activities, actions, lockers, and virtual assets.

29. The method of claim 21, further comprising collecting user data associated with the at least one fan and selling the user data to third party marketers.

30. A blockchain-based platform for monetizing a social media following, the platform comprising:
a processor including at least a content aggregation module, a gamifying module, an award module, and a blockchain module;
a memory for storing instructions executable by the processor;
wherein the content aggregation module is configured to:
receive content associated with an object of a social media following, the content being received from at least one content source, the at least one content source being external with respect to a user device associated with at least one fan of the object of the social media; and
aggregate the content received from the at least one content source;
wherein the gamifying module is configured to:
gamify the aggregated content received from the content aggregation module to facilitate interactions of the at least one fan of the object of the social media following with the aggregated content, wherein the gamifying includes customizing an activity environment for the at least one fan by creating, based on the aggregated content associated with the object of the social media following, a game related to the object of the social media following wherein the game includes at least one of the following: a trivia game, a digital scavenger hunt, a digital challenge, a contest, a microgame, a head-to-head competition, a check-in streaks, and a sweepstake;
determine that a location of the user device matches a predefined location cached in the memory, the predefined location being associated with a code, the code being located at the predefined location and being a trigger to launch the game;
based on the determination that the location matches the predefined location, prompt the at least one fan to capture, via a camera of the user device, the code at the predefined location;
receive, from the user, the code captured via the camera of the user device;
based on the receiving the code, trigger launching the game by presenting the game to the user via a graphical user interface associated with the user device, and wherein the at least one fan interacts with the activity environment via the graphical user interface;
wherein the award module is configured to:
while presenting the game, track, via the graphical user interface, the interactions of the at least one fan with the game;
analyze traffic consumption associated with the interactions of the at least one fan with the game;
analyze consumption of the aggregated content by the at least one fan during the interactions of the at least one fan with the game;
analyze responses provided by one or more of a plurality of fans to the interactions of the at least one fan with the game;
based on the interactions, the traffic consumption, the consumption of the aggregated content, and the responses provided by the one or more of the plurality of fans to the interactions of the at least one fan with the game, determine, in real time, engagement metrics associated with the interactions of the at least one fan with the game;

analyze overall traffic consumption associated with interactions of the plurality of fans with the game;

establish that the overall traffic consumption is lower that a predetermined threshold;

based on the establishing and the engagement metrics, dynamically change a reward to the at least one fan for interacting with the game in the activity environment to further facilitate the interactions of the at least one fan with the game, the reward including at least one virtual asset;

award the at least one virtual asset to the at least one fan based on the interactions with the game; and facilitate exchange of the at least one virtual asset for a currency;

wherein the blockchain module is configured to securely store transactions associated with the at least one virtual asset;

an augmented reality (AR) enabled user device associated with the at least one fan, the AR enabled user device being configured to:

run an AR application; and enable the at least one fan to capture physical objects via the AR application to obtain the at least one virtual asset;

a global positioning unit associated with the AR enabled user device, the global positioning unit being configured to determine the location of the AR enabled user device;

an artificial intelligence (AI) module configured to be trained on historical data associated with one or more of the following: the at least one fan and the object of a social media following; and a machine learning module configured to be trained on the historical data.

* * * * *